Feb. 8, 1927.
E. HOEHN
1,617,114
WELDED BUTT STRAP CONNECTION FOR SHEET METAL
Filed Sept. 14, 1923
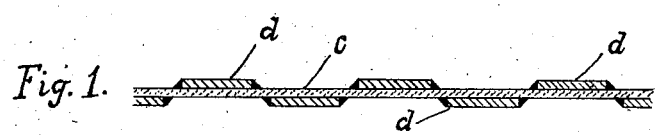
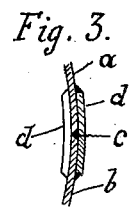
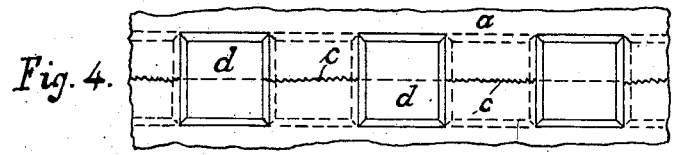
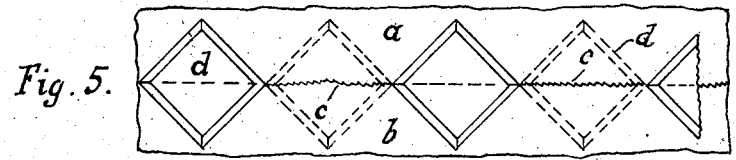
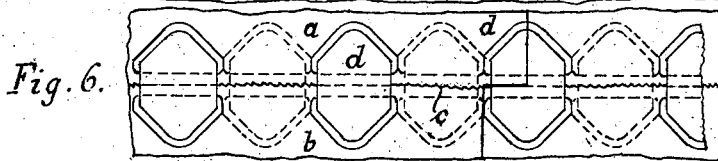
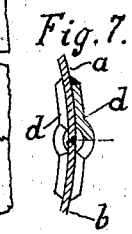
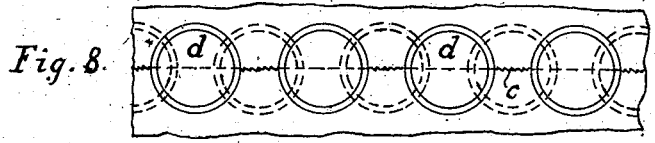
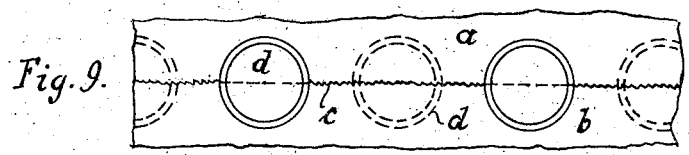
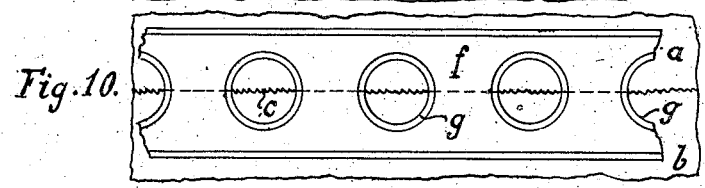
INVENTOR:
Ernest Hoehn
BY
Wm Wallace White
ATTY.

Patented Feb. 8, 1927.

1,617,114

UNITED STATES PATENT OFFICE.

ERNEST HOEHN, OF ZURICH, SWITZERLAND.

WELDED BUTT-STRAP CONNECTION FOR SHEET METAL.

Application filed September 14, 1923, Serial No. 662,792, and in Germany September 28, 1922.

Known butt-strap connections in which the sheet-metal parts are joined by a butt-strap welded to them running the length of the sheet-metal joint to be bridged over, have the disadvantage that the strap covers the joint throughout its whole extent, and so, especially when applied on both sides, prevents examination of it, which in many cases, especially in the welded seams of hollow ware subject to internal or external pressure, is indispensable, and butt-straps welded to such hollow ware on one side only of welded seams give rise to deleterious bending strains.

The subject of the invention is a butt-strap connection by which these disadvantages are avoided. In it there are free spaces intermediate between the connecting portions which cover the joint and are welded to the sheet-metal; and these free spaces leave the joint visible. Examination is therefore possible at least over a part of the length of the joint, even if butt-straps are provided on both sides. The joint to be bridged over may be a welded seam or a free or cemented joint, and may occur in the manufacture of a new article of any kind whatever, or in the repair of a fractured article.

Several examples of construction of the subject of the invention are illustrated in the accompanying drawing in which—

Fig. 1 is a longitudinal sectional view taken at the joint between the edges of a sheet metal plate or plates, showing one form of the improved connection;

Fig. 2 is a plan view of the connection shown in Fig. 1;

Fig. 3 is a transverse sectional view taken through the center line of the reinforced joint shown in Fig. 2;

Fig. 4 is a plan view of a sheet metal joint illustrating a modified form of the connecting members;

Fig. 5 is a plan view illustrating a further modified form of connecting member;

Figs. 6 and 7 are respectively a plan view and a transverse sectional view showing a still further modification of the connecting members;

Figs. 8 and 9 are views similar to Fig. 2, but showing modifications of the disposition of the connecting members over the joint; and Figs. 10 and 11 are respectively a plan view and a transverse sectional view illustrating a further modification of the connecting means.

The same characters of reference designate the same parts in the different figures of the drawings.

In the form shown in Figures 1 to 3, $a$ and $b$ are the pieces of sheet-metal to be joined. Their abutting edges, which may be bevelled to form a V as shown, or X in cross-section, or left parallel, are joined by a welded seam $c$. To strengthen this welded seam butt-strap segments $d$ are arranged in staggered relation above and below the seam $c$ so that on each side there are free spaces intermediate between the butt-strap segments. The edges of the butt-strap segments $d$, which also may be bevelled, or straight as shown, are welded to the solid sheet-metal. In this way the seam $c$ is visible throughout, alternately on one side and the other in spite of the presence of the butt-strap segments $d$. Bending strains cannot arise in the seam $c$ because the butt-strap segments are arranged symmetrically above and below the centre of gravity of the cross section of the sheet-metal (see Figure 3), which lies in the seam $c$. The whole joint is stiffer than one having an ordinary parallel-edged butt-strap welded upon one side (e. g. above), or even on both sides (above and below); because each separate butt-strap segment $d$ is welded around its edge nearly up to, or even right across the joint seam $c$. Springing or yielding of such a butt-strap segment therefore does not occur as it does in ordinary butt-straps with welded edges parallel to the joint.

In consequence of these advantages the strength of a seam reinforced with such alternate butt-strap segments $d$ is equal to or greater than that of the solid plate.

Some or all of the butt-strap segments $d$ may be wholly or partly welded on before the joint is welded at $c$, by which means strains in the sheet-metal upon welding at the seam $c$, which might bring about warping of the joint, may be avoided or diminished.

The form of the butt-strap segments $d$ may be varied as desired. While Figure 2 shows circular butt-strap segments, those of the examples in Figures 4 and 5 are quadrilateral, in the case of Figure 4 the mid-line, and in Figure 5 a diagonal, lying in the direction of the joint $c$.

In the example of Figures 6 and 7 the butt-strap segments where they bridge the seam are corrugated in case the seam stands up from the sheet metal.

The drawings show the butt-strap curved in cross-section to fit the curved sheets to be joined; it may obviously be flat for flat sheets, or angular where the seam is on an angle, and so on.

The free space intermediate between the butt-strap segments need not be equal in length to the segments in the direction of the seam, so that the projections of neighbouring butt-strap segments in plan contact with each other; it may be smaller (Figure 8) or larger (Figure 9).

Figures 10 and 11 illustrate an example of construction in which a longitudinal buttstrap $f$ is provided on one side which has portions $g$ cut away through which the seam is visible. The butt-strap $f$ is welded to the sheet metal along its outer edges, and if desired around the edges of the holes also. There may be another butt-strap of ordinary kind or perforated similarly to $f$ on the other side of the joint; and in the latter case the holes $g$ on the two sides are relatively staggered.

What I claim and desire to secure by Letters Patent is:

1. A connection for sheet metal joints, comprising connecting means having portions welded to the sheet metal at opposite sides of the joint, said welded portions being spaced apart to expose said joint.

2. A butt-strap connection for sheet-metal, formed of separate butt-strap segments which bridge over the sheet metal joint at intervals and are welded to the sheet-metal while the joint remains visible between them.

3. A butt-strap connection for sheet-metal formed of separate butt-strap segments which bridge over the sheet-metal joint at intervals and are welded to the sheet-metal while the joint remains visible between them, the butt-strap segments being corrugated where they bridge over the joint.

4. A connection for sheet metal joints, comprising connecting elements having portions welded to the metal at one side thereof, said welded portions being spaced apart to expose the joint, and connecting elements having portions welded to the metal at the opposite side thereof, said welded portions being spaced apart, the welded portions at one side of the metal being disposed in staggered relation to those at the opposite side thereof.

In testimony whereof I have signed my name to this specification.

ERNEST HOEHN.